United States Patent
Wu et al.

(10) Patent No.: US 11,307,837 B2
(45) Date of Patent: Apr. 19, 2022

(54) RUNTIME TYPE IDENTIFICATION OF AN OBJECT UTILIZING CLASS INHERITANCE RELATIONSHIPS

(71) Applicant: International Business Machines Corporation, Armonk, NY (US)

(72) Inventors: Zixuan Wu, Hangzhou (CN); Ke Wen Lin, Shanghai (CN); Qing Shan Zhang, Pudong (CN); Kang Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/000,407

(22) Filed: Aug. 24, 2020

(65) Prior Publication Data
US 2022/0058006 A1    Feb. 24, 2022

(51) Int. Cl.
*G06F 8/41*    (2018.01)

(52) U.S. Cl.
CPC .............. *G06F 8/434* (2013.01); *G06F 8/443* (2013.01)

(58) Field of Classification Search
CPC ................................. G06F 8/434; G06F 8/443
See application file for complete search history.

(56) References Cited

U.S. PATENT DOCUMENTS

| | | | | | |
|---|---|---|---|---|---|
| 5,907,707 | A | * | 5/1999 | Ramalingam | G06F 9/449 |
| | | | | | 712/E9.084 |
| 6,138,269 | A | * | 10/2000 | Ball | G06F 9/4492 |
| | | | | | 717/108 |
| 6,182,153 | B1 | * | 1/2001 | Hollberg | G06F 9/465 |
| | | | | | 719/315 |
| 6,225,998 | B1 | * | 5/2001 | Okita | G06F 8/34 |
| | | | | | 707/999.102 |
| 6,675,377 | B1 | * | 1/2004 | Tanaka | G06F 9/449 |
| | | | | | 717/152 |

(Continued)

FOREIGN PATENT DOCUMENTS

EP    1486870 B1    4/2016

OTHER PUBLICATIONS

Nakano et al., "Runtime Support for Extended Types in C++" (Year: 1995).*

(Continued)

*Primary Examiner* — Phillip H Nguyen
(74) *Attorney, Agent, or Firm* — William H. Hartwell

(57) ABSTRACT

Embodiments of the present disclosure relate to runtime type identification (RTTI) of an object. In an embodiment, a computer-implemented method is disclosed. A class inheritance relationship between a plurality of classes in at least one source code section is generated. Respective type identifications are assigned to identify the classes in the class inheritance relationship. In accordance with presence of a first operation related to accessing a target pointer to an object of a target class of the classes, a type identification for the target class is caused to be recorded with at least one bit of a memory address of the target pointer that can be omitted in addressing the target pointer. RTTI is caused to be performed based on the class inheritance relationship and the at least one bit of the memory address of the target pointer. In other embodiments, a system and a computer program product are disclosed.

20 Claims, 8 Drawing Sheets

(56) References Cited

U.S. PATENT DOCUMENTS

| | | | | |
|---|---|---|---|---|
| 6,751,793 | B1 * | 6/2004 | Lung | G06F 9/4492 |
| | | | | 717/162 |
| 7,743,368 | B2 * | 6/2010 | Das | G06F 9/4491 |
| | | | | 717/151 |
| 7,793,273 | B2 * | 9/2010 | Mercer | G06F 9/4492 |
| | | | | 717/141 |
| 8,458,630 | B1 * | 6/2013 | Van Canpenhout | G06F 30/327 |
| | | | | 716/104 |
| 2007/0038988 | A1 | 2/2007 | Das | |
| 2012/0185824 | A1 | 7/2012 | Sadler | |

OTHER PUBLICATIONS

"LLVM Programmer's Manual", LLVM Compiler Infrastructure, retrieved from the Internet on Mar. 26, 2020, 57 pages, <http://llvm.org/docs/ProgrammersManual.html#the-isa-cast-and-dyn-cast-templates>.

Mell et al., "The NIST Definition of Cloud Computing", Recommendations of the National Institute of Standards and Technology, Special Publication 800-145, Sep. 2011, 7 pages.

Rodchenko et al., "Type Information Elimination from Objects on Architectures with Tagged Pointers Support", IEEE Transactions on Computers, Jan. 2018, pp. 130-143, vol. 67 No. 1, <https://www.computer.org/csdl/journal/tc/2018/01/07962268/13rRUwbs20m>.

Telea, Alexandru, "A General-Purpose Run-Time Type Information System for C++", Oct. 7, 1997, pp. 1-17, <https://pdfs.semanticscholar.org/ca44/58d8cb126fe6eae8f19cab6efb9b9fe47c88.pdf>.

\* cited by examiner

RUNTIME TYPE IDENTIFICATION OF AN OBJECT UTILIZING CLASS INHERITANCE RELATIONSHIPS

BACKGROUND

The present disclosure relates to computer techniques, and more specifically, to a method, system, and computer program product for runtime type identification (RTTI) of an object pointed to by a pointer. As used herein, an object is an instance of a particular class.

A variety of object-oriented programming languages offer subtype polymorphism using subclassing (also known as inheritance). Examples of such object-oriented programming languages include, but are not limited to, C++, Java, and Swift. A class inheriting from a base class is referred to as a subclass of the base class. In an object-oriented program, it is possible for a pointer of a base class to point to an object of the base class as well as different objects of its subclasses at runtime. As a result, in many operations such as execution of a "dynamic_cast" operation and exception handling, RTTI is implemented to determine the actual class of the object that the pointer points to and the inheritance relationship between different classes during runtime.

SUMMARY

According to an aspect of the present invention, there is a method, computer program product and/or system that performs the following operations (not necessarily in the following order): generating a class inheritance relationship between a plurality of classes in at least one source code section; assigning respective type identifications to identify the plurality of classes in the class inheritance relationship; in accordance with presence of a first operation related to accessing a target pointer to an object of a target class of the plurality of classes in the at least one source code section, causing a type identification for the target class to be recorded with at least one bit of a memory address of the target pointer, the at least one bit being omitted in addressing the target pointer; causing runtime type identification of the object of the target class pointed to by the target pointer to be performed based on the class inheritance relationship and at least one bit of the memory address of the target pointer.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
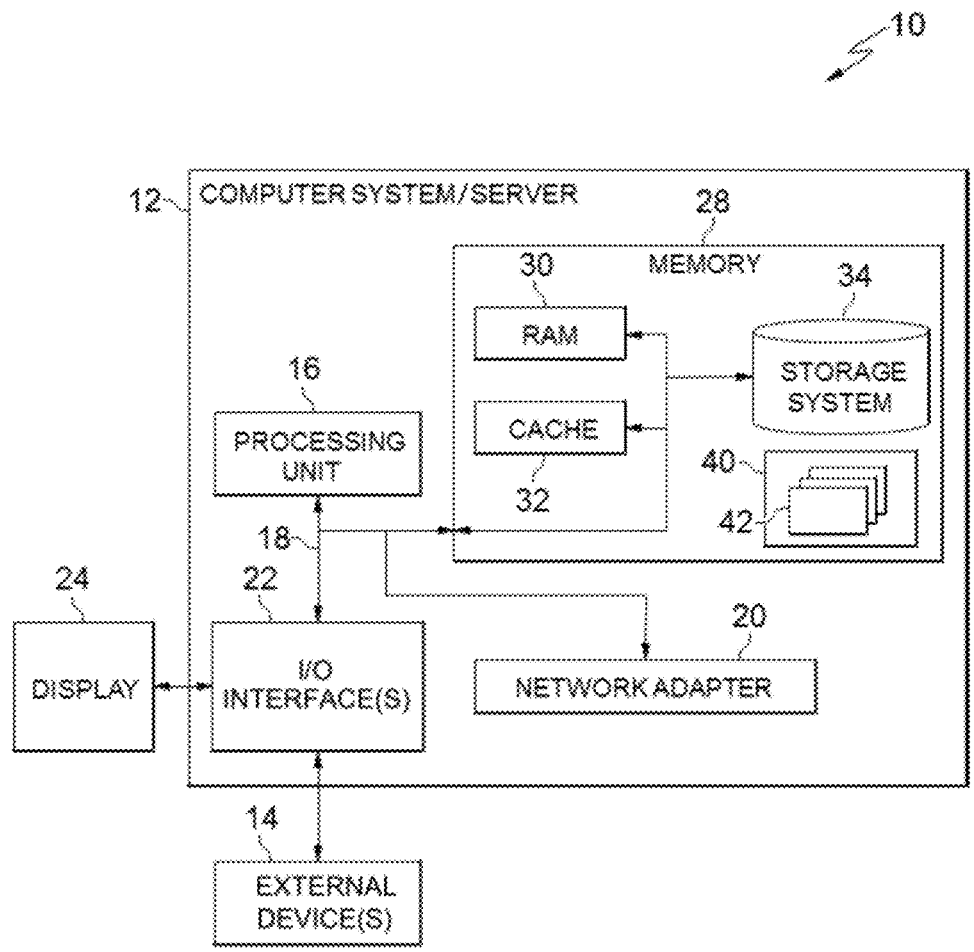
FIG. 1 depicts a cloud computing node according to some embodiments of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
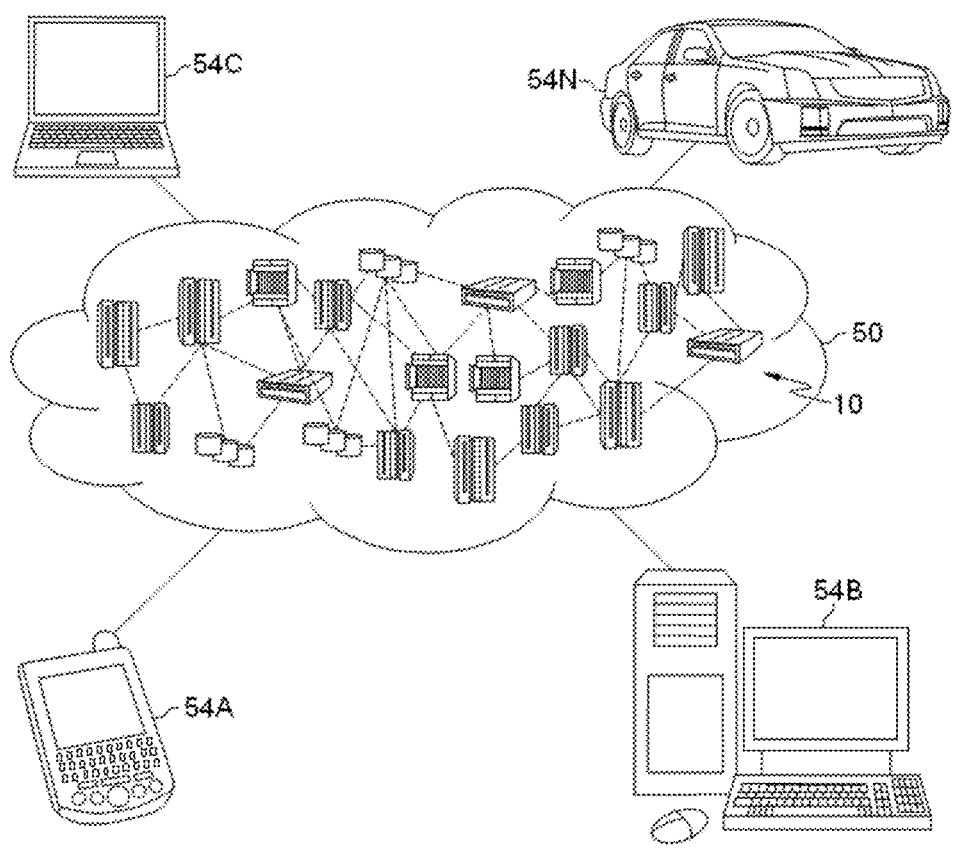
FIG. 2 depicts a cloud computing environment according to some embodiments of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
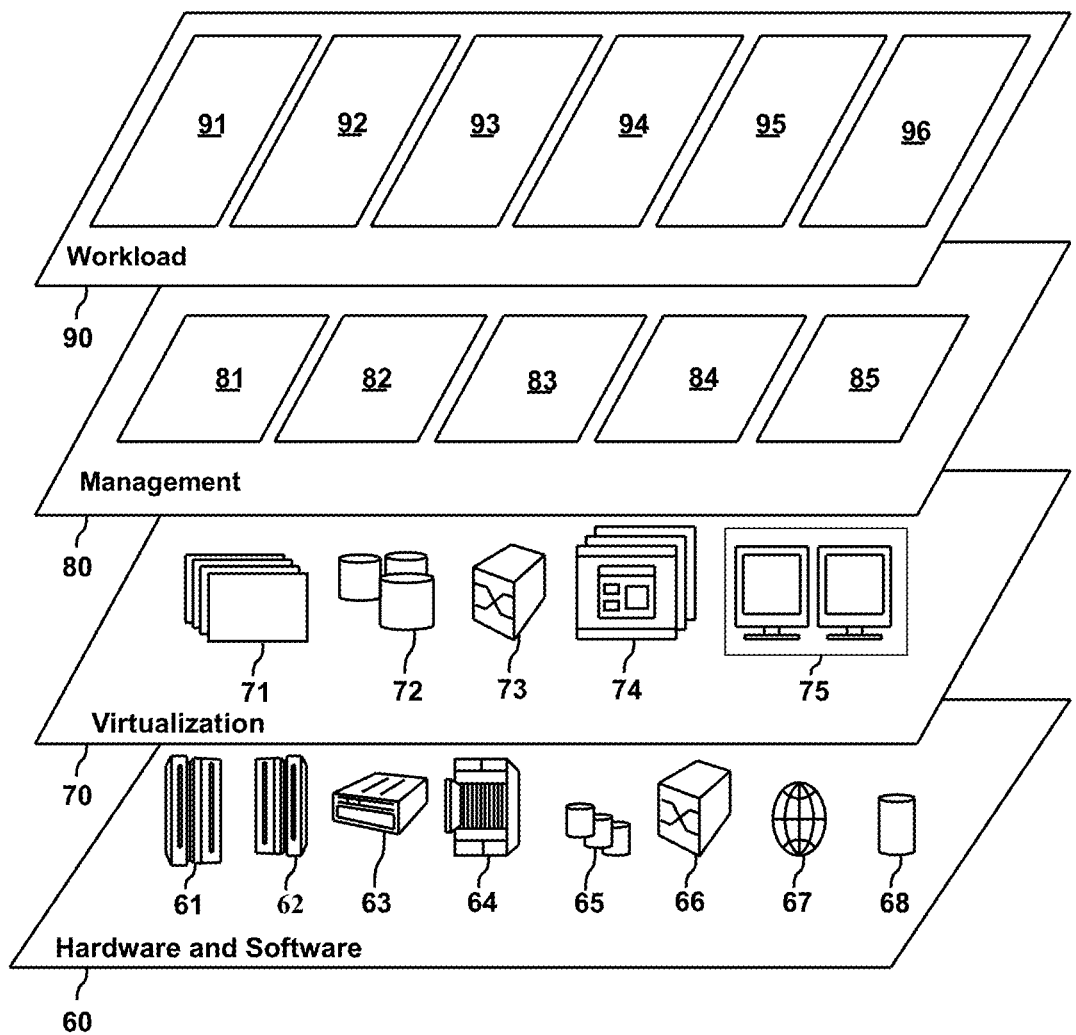
FIG. 3 depicts abstraction model layers according to some embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and runtime type identification (RTTI) 96. The functionalities of RTTI will be described in the following embodiments of the present disclosure.

In object-oriented programs, data structures known as "objects" that are instances of particular classes (or types) are created, manipulated, and/or deleted during the course of either compilation of and/or during the execution of an object-oriented program. One or more objects of a class may be defined in an object-oriented program. In addition, subclasses can be defined to inherit from a base class, which is known as subclassing or inheritance. The base class may sometimes be referred to as a parent class. As mentioned above, a pointer of a base class may point to an object of the base class as well as different objects of its subclasses at runtime.

Figure 4:
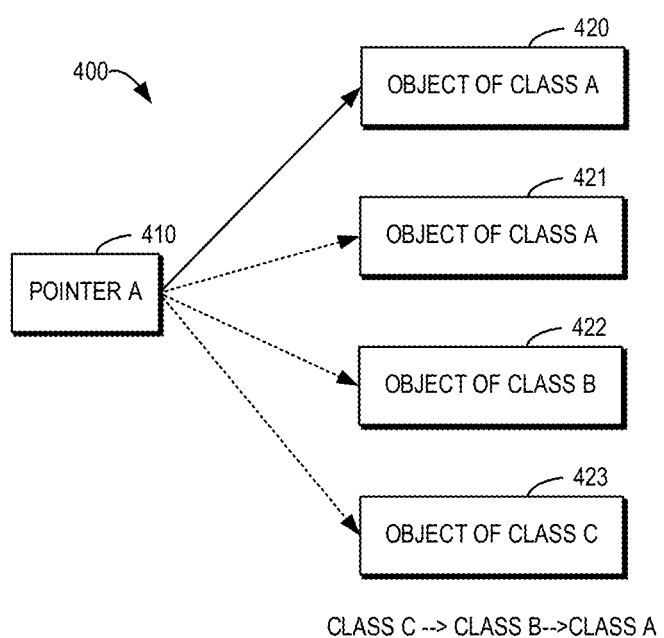
FIG. 4 depicts an example of possible pointing options of a pointer to an object of a class.

FIG. 4 is an example illustrating some possible pointing options of a pointer to an object of a class. In this example 400, class B inherits from class A, and class C inherits from class B. Thus, classes B and C are both subclasses of class A, while class C is also a subclass of class B. In a particular program, objects 420 and 421 are created for class A, an object 422 is created for class B, and an object 423 is created for class C. As shown, a pointer A 410, which is a pointer of class A, may be configured to point to any of the objects 420 through 423 at runtime.

Generally, a pointer of a class pointing to an object of either this same class or its subclass is allowed according to the rules in object-oriented programming languages. However, it is not allowed if a pointer of a class is set to point to an object of its parent class or an object of a class that has no inheritance relationship. To avoid this situation, a mechanism of runtime type identification (RTTI) can be employed to determine the type of the object (more specifically, the class of the object) that a pointer points to at runtime, for example, during execution of a program.

Many operations in object-oriented programs can be executed to perform runtime type identification (RTTI). For example, in the C++ programming language, an operation called "dynamic_cast" involves RTTI. An example of the operation may be written as: B*=dynamic_cast<B*>(A*). This "dynamic_cast" operation takes the pointer of class A and determines if the pointer actually points to an object of class B and if class B inherits from class A. To perform the "dynamic_cast" operation, the actual class of the object to which the pointer points and the inheritance relationship between the classes (e.g., between class A and class B) are required. Other RTTI-related operations such as exception handling and the "instanceof" operation also require similar information as the "dynamic_cast" operation.

In some solutions, a runtime type information object is created for each class in an oriented-object program to record information on the class type and the inheritance relationship with other classes at runtime in a memory. Each object of the class has a pointer to the runtime type information object so that the actual class type of the pointer can be accessed. According to such a mechanism, to determine the actual class type of the object and/or whether two classes have an inheritance relationship, at least two pointer dereferences have to be performed. For example, a first dereference of the pointer to the object of the class is performed to determine the associated pointer to the runtime type information object, and a second dereference of the pointer to the runtime type information object is performed so as to get the information recorded in the runtime type information object. In the C++ programming language, more pointer dereferences are needed because each object of a class further has a pointer to a virtual table (referred to as "vtable") and then the virtual table has a further pointer to the runtime type information object. Thus, such a mechanism can be extremely inefficient with several indirect accesses and may highly impact program runtime performance Additionally, the memory consumption for a class identification object may not be trivial.

Another example solution is based on using static identifiers (ID) which include a type-ID field in a definition of a base class. All type identifications of the base class and its subclasses are enumerated in the type-ID field manually when writing the definition. This field can then be checked to determine a current object type. With reference to the class inheritance in the example of FIG. 4, in a definition of class A, type identifications of Classes A, B, and C are enumerated in a type-ID field of class A, type identifications of Classes B and C are enumerated in a type-ID field of class B, and a type identification for class C is listed in a type-ID field of class C if it has no subclass. However, manually programming the definitions of the classes may be an error prone and time-consuming exercise as the type identifications are required to be unique globally and the inheritance relationship of the classes may be updated requiring maintenance of the inheritance relationship. Further, enumerating the type identifications in the definitions may increase the memory cost.

According to aspects of the present disclosure, systems and methods can provide runtime type identification (RTTI) of an object. In particular, in some embodiments, systems and methods of the present disclosure can provide for improved space and time performance of RTTI by generating class relationship inheritance tables and transforming some operations, such as "dynamic_cast" operations, to a lookup function on a relationship table based on type identification encoded in some of the memory bits of a pointer, for example, during compiling of source code sections (e.g., a compilation unit or file).

Specifically, in some embodiments, a class inheritance relationship between a plurality of classes in one or more source code sections (e.g., a compilation unit or file) can be automatically determined, for example, by analyzing class definitions when compiling the source code section(s), and a class inheritance relationship table can be generated for each source code section to store the inheritance relationships. Then type identifications can be assigned to identify the plurality of classes in the class inheritance relationships. Memory bits of a target pointer to an object of a target class can be used to record type identification data for a target class. Specifically, if an operation related to accessing a target pointer to an object of the target class is found in the source code section(s), one or more bits of a memory address of the target pointer can be used to record the type identification data for the target class, for example. The bit(s) for recording the type identification are bit(s) that are not used for addressing the target pointer (e.g., in determining the memory address of the target pointer). For example, a tagged pointer may be used, which is a pointer (e.g., a memory address) having additional data associated with it (e.g., in some most/lowest significant bits of the pointer), and these bits of the pointer variable are unused in addressing and may even be ignored by some hardware platforms (e.g., ARM64) when addressing the memory. RTTI of the object of the class pointed to by the target pointer can be performed based on the class inheritance relationship and the one or more bits of the memory address of the target pointer.

According to some example embodiments, by eliminating a class identification object and using bits of a memory address of a target pointer to recode a type identification for a target class, less dereferences may be required to access the type identification and less memory space may be consumed. As such, the runtime performance of source code may be improved accordingly. Further, the whole RTTI process may be performed automatically and can be transparent to the user (e.g., the programmer), thus being more user friendly.

Other aspects of the present invention will be described with reference to the example embodiments and the accompanying drawings below. Some embodiments described herein refer to the C++ programming language. However, it would be appreciated that the references to the C++ programming language are included in the present disclosure for illustrative purposes only. The present invention is not limited to the C++ computer programming language but is applicable for any other object-oriented programming languages, such as Java and Swift.

Figure 5:
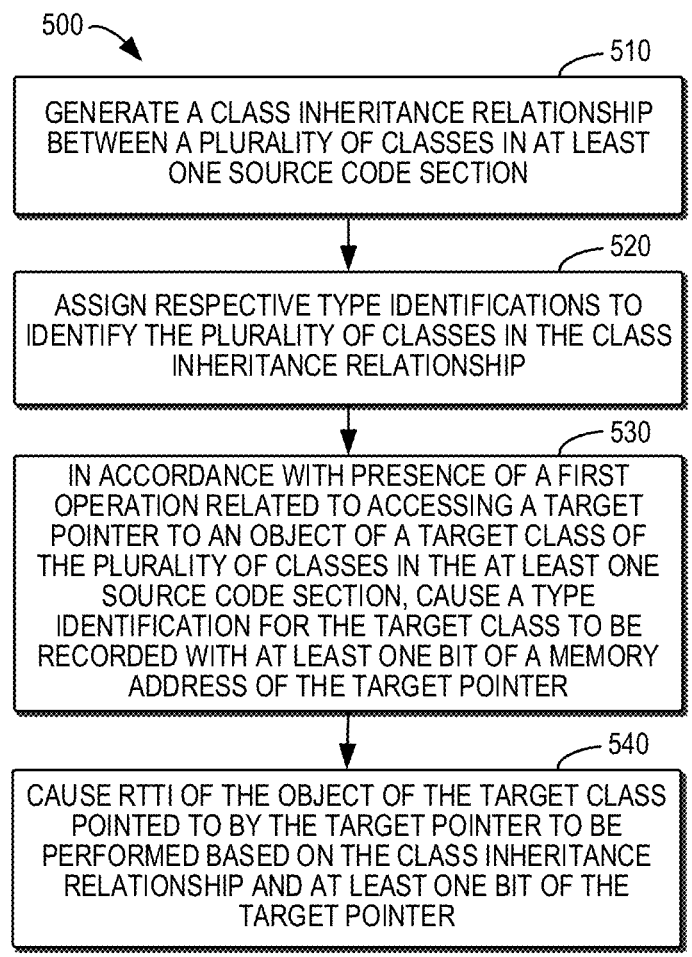
FIG. 5 depicts a flowchart of a process for RTTI of an object according to some embodiments of the present invention.

Reference is now made to FIG. 5, which illustrates a flowchart of an example process 500 according to some embodiments of the present invention. The process 500 can be implemented on any computer system, such as the computer system/server 12 discussed above with reference to FIG. 1, to implement RTTI of an object of a class. For the purpose of discussion, the process 500 will be described with reference to FIG. 1.

At block 510, the computer system/server 12 generates a class inheritance relationship between a plurality of classes in at least one source code section. A source code section is a portion of source code of a program and may be written in an object-oriented programming language. A source code section is generally a compilation unit of the program to be compiled, for example, by a compiler. A source code section may be represented as a source code file in some examples. In a specific example, a whole program may be included in one source code section, for example, in one source code file. In other examples, the program may consist of a plurality of source code sections.

A plurality of classes can be defined in the source code section(s). As mentioned above, a class may inherit from a base class and thus may be referred to as a subclass of the base class. Such class inheritance may be written in definitions of the classes that are included in one or more source code sections. Accordingly, the class inheritance relationship may be determined by analyzing the definitions of the classes in the source code section(s). In some embodiments, the analysis may be performed by compiling the source code section(s), for example, via a compiler.

In some cases, among a plurality of source code sections divided from a program, a source code section may include a definition(s) of one or more but not all of the plurality of classes. Then a partial class inheritance relationship may be determined from one of the plurality of source code sections. A plurality of partial class inheritance relationships determined from the plurality of source code sections may be combined to form a resulting class inheritance relationship, for example, during linking operations performed by a linker. It is noted that among all the source code sections of a program, one or more source code sections may not include any definition of the classes and thus no class inheritance relationship can be derived therefrom.

In some embodiments, the class inheritance relationship may be generated to include a plurality of elements, each of the plurality of elements indicating whether a class of the plurality of classes inherits from another class of the plurality of classes or not. As an example, the class inheritance relationship may be represented as a relationship table including the respective elements. In some example embodiments, a class may be indicated as having an inheritance with itself in the class inheritance relationship.

At block 520, the computer system/server 12 assigns respective type identifications to identify the plurality of classes in the class inheritance relationship. The type identifications of the plurality of classes may be unique across all the source code section(s) of the program. The assigning of the type identifications may be assigned after the class inheritance relationship is determined. With the type identifications, it is possible to localize an inheritance between any two classes from the class inheritance relationship between all the classes.

In embodiments of the present invention, the computer system/server 12 also detects whether there is any operation related to accessing a target pointer to an object of a target class of the plurality of classes in the at least one source code section. The detection may be performed, for example, by compiling the at least one source code section. If an operation related to accessing the target pointer (sometimes referred to as a "first operation" herein) is present in the at least one source code section, at block 530, the computer system/server 12 causes a type identification for the target class to be recorded with at least one bit of a memory address of the target pointer.

As briefly introduced above, in embodiments of the present invention, a memory address of a target pointer pointing to an object of a target class can be used to record a type identification for the target class. Specifically, the type identification for the target class is recorded with one or more bits of the memory address. A memory address of the target pointer is used to address the target pointer and is typically stored in a memory with a certain number of bits. For example, in a 64-bit memory, the memory address of the target pointer is stored as a 64-bit value. Some bits of the memory address of the target pointer can be omitted or ignored in addressing the target pointer. In other words, the target pointer can be correctly represented with the remaining bits of the memory address. Such type of target pointer may sometimes be referred to as a tagged pointer which supports additional information stored in association with its memory address. The bits for supporting the storage of the additional information are reused to record the type identification in embodiments of the present disclosure. As a result, the type identification for the target class is stored in line with the memory address of the target pointer in a certain memory space.

The number of bits reused for recording the type identification may depend on the actual value assigned to uniquely identify the target class. In some cases, one or more most significant bits (MSBs) and/or lowest significant bits (LSBs) of the memory address can be omitted in representing a value of a memory address of a target pointer and thus may be reused to record the type identification in embodiment of the present invention. As a specific example, the type identification may be moved to be recorded with sixteen MSBs of the memory address of the target pointer. In another example, sixteen LSBs of the memory address of the target pointer are not used in representing the memory address and thus can be reused to record the type identification. It should be appreciated that depending on the memory architecture, in some examples, some middle bits of the memory address and/or other numbers of MSBs or LSBs may be reused to record the type identification without impacting on addressing of the target pointer.

In some embodiments, with the type identification encoded, if the memory address of the target pointer is to be converted to an integer type to perform calculations such as addition, subtraction, multiplication, and/or division, the one or more bits encoded with the type identification may be cleared, for example, set as zeros in the stored value obtained by addressing the target pointer through an addressing operation. Thus, the resulting value can represent the memory address of the target pointer correctly.

The recording of the type identification is to track the actual type identification for a class which has an object pointed to by a target pointer at runtime, to facilitate RTTI. The first operation that triggers the recording of the type identification may include any operation related to assessing the target pointer to the object of the target class. In some embodiments, the first operation may comprise an operation of creating the object of the target class, for example, an operation with a "new" operator in the C++ programming language. At the time an object of a class is created, a target pointer is set to point to this object.

Alternatively, or in addition, the first operation may comprise an operation of getting the memory address of the target pointer, e.g., an operation of addressing the target pointer. Such an operation of addressing the target pointer may include a "&" operator. The first operation may also comprise an operation of converting a memory address to the target pointer. In case of this operation, the type identification for the target class may also be recorded with the particular memory address. It would be appreciated that any other operation related to assessing the target pointer to the object of the target class may also trigger the recording of the type identification.

It is expected that the type identification for the target class is recorded in line with the memory address in a memory space at runtime. To cause the recording of the type identification at runtime, in some embodiments, the computer system/server 12 may generate an operation (sometimes referred to as a "second operation" herein) in an executable corresponding to the source code section(s) of a program to implement the recording, which will be described in detail with reference to FIG. 6.

With the class inheritance relationship generated and the availability of the recording of the type identification for the target class, at block 540, the computer system/server 12 causes RTTI of the object of the target class pointed to by the target pointer to be performed based on the class inheritance relationship and the at least one bit of the memory address of the target pointer.

The RTTI generally involves determination of the actual class of the object to which the target pointer points and the inheritance relationship between the target class and a further class. To perform the RTTI at runtime, the computer system/server 12 may make reference to the class inheritance relationship based on the type identification for the target class extracted from the memory address of the target pointer.

Generally, RTTI of an object of a class pointed to by a certain pointer is performed at runtime of the source code section(s). The computer system/server 12 may generate an operation in an executable corresponding to the source code section(s) of a program to cause the RTTI to be performed, which will be described in detail with reference to FIG. 6.

In the process 500, some of the steps may be performed by compiling the source code section(s) via a compiler. A compiler transforms source code of a program from high-level programming languages to machine executable code. The complied source code may sometimes be referred to as intermediate code or object code in the object-oriented programming language. The intermediate code or object code is further passed to a linker, which is configured to link different intermediate code sections compiled from different source code sections to form an executable. The linker may further resolve any unresolved references, e.g., symbols for addressable functions or variables that are called or referenced in the intermediate code but are not internally defined. As a result, the executable output by the linker can allow execution of the program. In summary, a source code section(s) of a program can be passed through a compiling stage and a linking stage to generate a corresponding executable.

Figure 6:
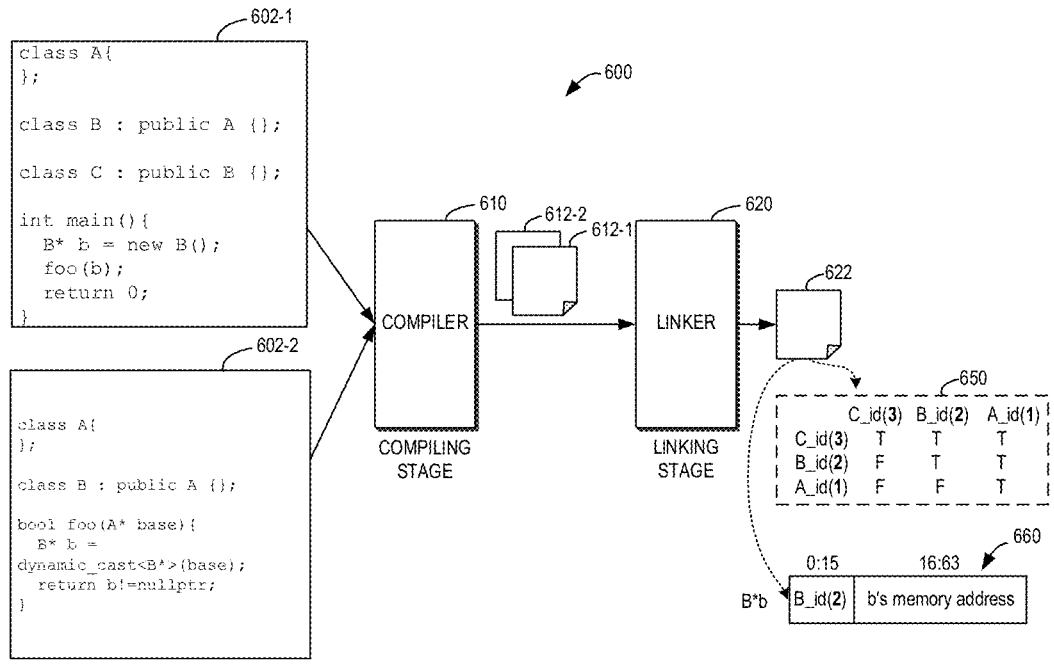
FIG. 6 depicts a block diagram of an execution environment for source code according to some embodiments of the present invention.

For the purpose of RTTI, in some embodiments of the present disclosure, the process 500 may be implemented in an execution environment using a compiler and a linker. FIG. 6 illustrates an example of such embodiments. In FIG. 6, an execution environment 600 comprises a compiler 610 and a linker 620. The compiler 610 and the linker 620 may be incorporated in a software application run on the computer system/server 12 in some examples. In other examples, the compiler 610 and the linker 620 may be implemented as separate software applications.

One or more source code sections, such as source code sections 602-1, 602-2 (collectively or individually referred to as source code sections 602), are input to the compiler 610 for compilation. It would be appreciated that although two source code sections are illustrated in FIG. 6 and are described in the following, a different number (larger than or lower than two) of source code sections may also be received by the compiler 610 in other examples. In addition, the code in the two source code sections 602 are presented for purpose of illustration only, without suggesting limitations to the present invention.

At a compiling stage, the compiler 610 compiles the source code sections 602-1, 602-2 sequentially or in parallel, to generate intermediate code sections 612-1, 612-2 for the source code sections 602-1, 602-2, respectively. At a linking stage, the linker 620 links the intermediate code sections 612-1, 612-2 to generate an executable 622. To support RTTI in the executable 622, in some embodiments of the present disclosure, the executable 622 makes reference to a class inheritance relationship 650 between a plurality of classes in the source code sections 602-1, 602-2.

In addition, in a memory space 660, bits of a memory address of a target pointer, such as sixteen MSBs are used to record a type identification for a target class which has an object pointed to by the target pointer. The executable 622 accesses the memory space 660 at runtime to get the type identification for the target class from the sixteen MSBs. The remaining bits are used to represent the actual memory address of the target pointer. In this example, a 64-bit memory space is shown and thus the low-order 48 bits are used to record the actual memory address of the target pointer.

During compiling of the source code sections 602-1, 602-2, the compiler 610 may analyze definitions of a plurality of classes included in the respective source code sections 602-1, 602-2 to determine respective partial class inheritance relationships therefrom. As specifically illustrated in FIG. 7A, the source code section 602-1 defines class A and further defines that class B inherits from class A (with code "class B: public A { }") and class C inherits from class B (with code "class C: public B { }"). A partial class inheritance relationship 712-1 corresponding to the source code section 602-1 is generated by the compiler 610 and may be represented as a table.

In the table representing the partial class inheritance relationship 712-1, each row and each column represents a class, using column/row names of "X_id" where X is A, B, or C. An element "T" or "F" in a certain row and a certain column indicates whether it is true or false that the class represented by the row inherits from the class represented by the column. For example, the element "T" in the first row and the second column indicates that it is true that class C inherits from class B, while the element "F" in the second row and the first column indicates that it is false (not true) that class B inherits from class C. Further, in the class inheritance relationship, a class is recorded to have an inheritance with itself. For example, the element "T" in the second row and the second column indicates that it is true that class B has an inheritance with class B.

Figure 7A:
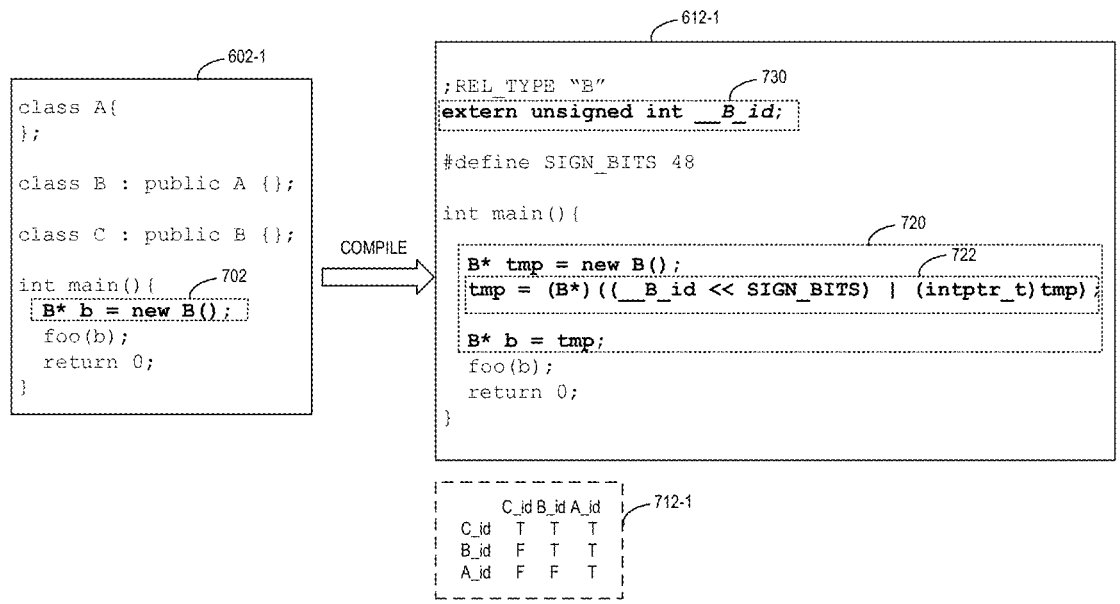
FIGS. 7A-7C depict some examples of a compiling stage of source code sections according to some embodiments of the present invention.
Figure 7B:
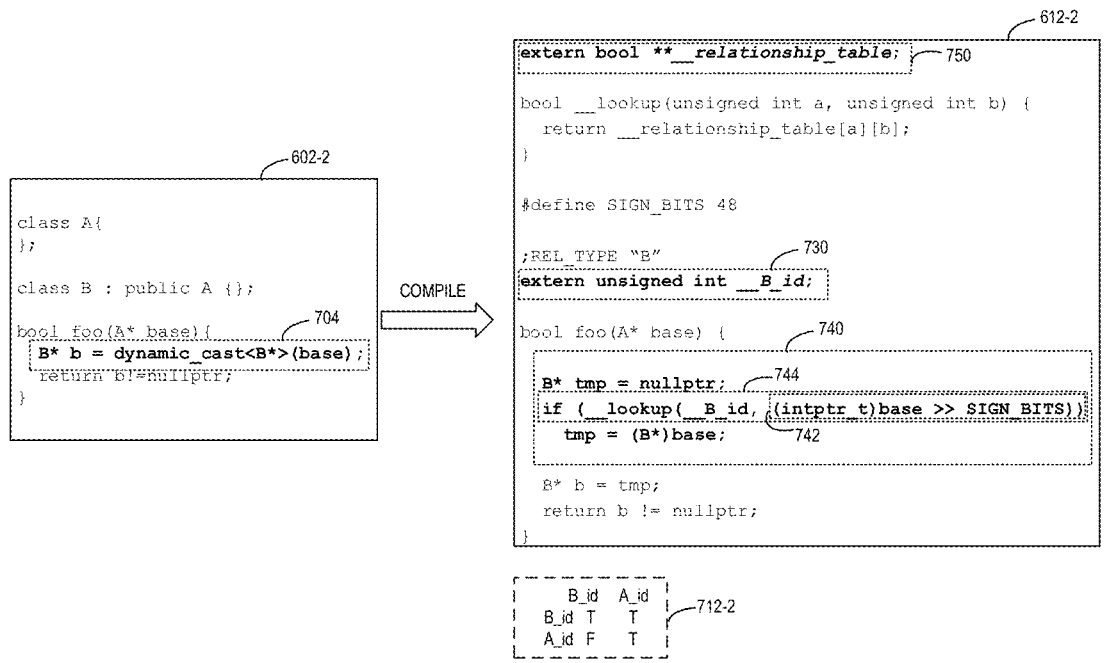

Similarly, according to the definitions of the classes included in the source code section 602-2, a partial class inheritance relationship 712-2 between class A and class B may be generated by the compiler 610, as specifically illustrated in FIG. 7B. The partial class inheritance relationships 712-1 and 712-2 may be combined by the linker 620 at the linking stage in order to form the class inheritance relationship 650, which will be described in detail below. In some embodiments, as each source code section 602 may provide parts of the definitions of the classes used in a program, the type identifications for the classes may be assigned at the linking stage after the partial class inheritance relationships are combined at the later linking stage.

In addition, to facilitate generating of the class inheritance relationship between the classes in the two source code sections 602, the compiler 610 may detect whether there is an operation related to accessing a target pointer to an object of a certain target class in order to cause a type identification for the target class to be recorded. The compiler 610 may also detect whether there is an operation involving RTTI of the object of the target class pointed to by the target pointer in order to cause the RTTI to be performed at runtime.

In compiling the source code section 602-1, the compiler 610 detects an operation 702 which is an operation of creating an object of class B, as can be seen from FIG. 7A. The compiler 610 may decide to record a type identification for class B with some bits of a memory address of a target pointer (represented as a pointer "b" in the source code section 602) to the object that is to be created. To enable the recording of the type identification at runtime, the compiler 610 transforms the operation 702 to a set of operations 720 which includes a specific operation 722 of recording the type identification for the target class with some bits of the memory address of the target pointer "b". The set of operations 720 may be incorporated in the intermediate code section 612-1, which may in turn used to generate the executable 622 by the linker 620.

Specifically, the operation 722 requires left shifting the memory address of the target pointer "b" to the object of class B by 48 bits (by setting a variable "SIGN_BITS" to be "48") and storing the type identification represented as "_B_id" with the sixteen MSBs of the memory address. In this example, it is assumed that the memory address of the target pointer "b" is a 64-bit value although other number of bits may be applied depending on the memory architecture.

In some embodiments, since the type identifications for the classes are not assigned at the compiling stage, in generating the operation 722, the compiler 610 may represent the type identification for the target class as an external relocation symbol in the intermediate code section 612-1. For example, a statement 730 is included in the intermediate code section 612-1 to define the type identification for class B as an external relocation symbol "_B_id". The external relocation symbol may be resolved at the linking stage by the linker 620 after the respective type identifications of the classes are assigned.

The operation of creating an object of a class provided in FIG. 7A is merely an example operation related to accessing of the object. In other examples, the source code sections 602 may include one or more other operations that are related to accessing of the corresponding object, such as an operation of getting a memory address of a pointer, an operation of converting a memory address to the pointer, and the like. The compiler 610 may also transform the operation(s) to a further operation(s) that causes recording of the corresponding type identification.

Figure 7C:
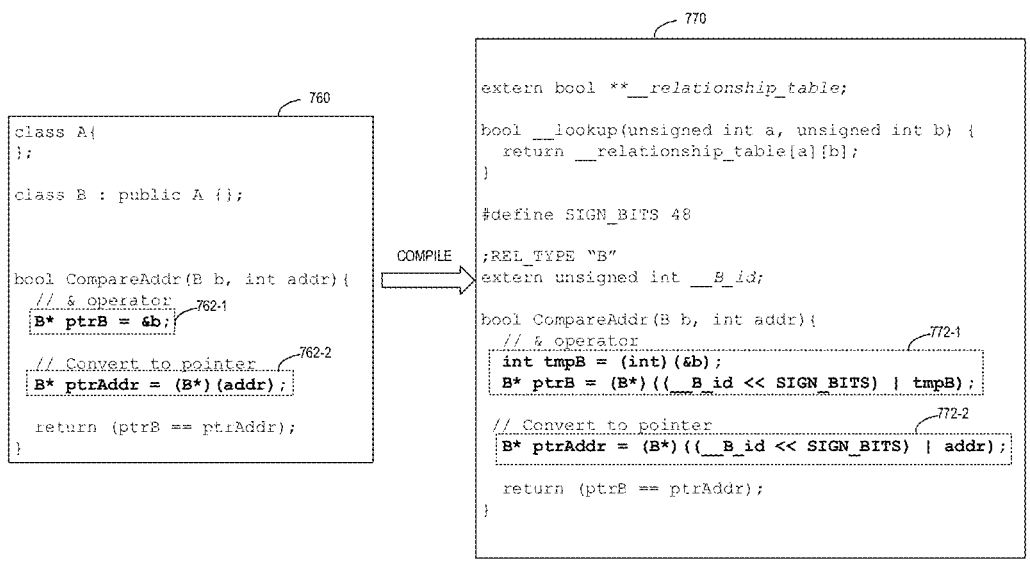

FIG. 7C shows the transformation of the operation of getting a memory address of a target pointer and the operation of converting a memory address to the pointer at the compiling stage. As shown, a source code section 760 includes an operation 762-1 with an operator "&" to get a memory address of a target pointer "b" which points to an object of class B, and an operation 762-2 of converting a memory address represented as "addr" to the target pointer which points to an object of class B. The compiler 610 may transform the operations 762-1, 762-2 to operations 772-1, 772-2, respectively, in an intermediate code section 770. The operations 772-1, 772-2 may be programmed to cause a type identification for class B to be recorded in the sixteen MSBs of the memory address of the corresponding target pointer, respectively.

In compiling the source code sections 602-1, 602-2, in addition to an operation of related to accessing the target pointer, the compiler 610 may further detect an operation (sometimes referred to as a "third operation" herein) for RTTI of an object of the target class pointed to by the target pointer in the source code sections 602-1, 602-2. Examples of such an operation include, but are not limited to, a "dynamic_cast" operation of converting a target pointer of a base class to be a pointer to an object of a subclass, and an "instanceof" operation of determining whether an object is an instance of a certain class. It should be appreciated that the present disclosure is also applicable to any other RTTI-related operations that include determining a type identification for a class and an inheritance between that class and another class.

Referring back to FIG. 7B, the compiler 610 may detect a "dynamic_cast" operation 704 from the source code section 602-2 at the compiling stage, which requires converting a target pointer of a base class to be a pointer to an object of class B. To provide for RTTI to be performed at runtime, the compiler 610 may determine a transform of the third operation for RTTI to an operation (sometimes referred to as a "fourth operation") of extracting the type identification for the target class from the memory address of the target pointer and an operation (sometimes referred to as a "fifth operation") of searching, from the class inheritance relationship, for an inheritance between the target class and a further class based at least on the extracted type identification.

In the example shown FIG. 7B, the compiler 610 may transform the "dynamic_cast" operation 704 to be a set of operations 740 which includes an operation 742 of extracting the type identification and an operation 744 based on a "_lookup" function to search the class inheritance relationship based on the extracted type identification. The extraction of the type identification may be performed by right shifting the memory address of the target pointer to a base class by 48 bits (by setting a variable "SIGN_BITS" to be "48"). The target pointer to a base class is the pointer "b" through calling the function "foo( )" in this example. The sets of operations 740 may be incorporated in the intermediate code section 612-2, which may in turn used to generate the executable 622 by the linker 620.

At runtime, the operation 742 can thus cause extraction of the type identification recorded with the sixteen MSBs of the memory address of the target pointer "b." The operation 744 can cause looking up the class inheritance relationship with the extracted type identification and a known type identification (which is "_B_id" for class B according to the "dynamic_cast" operation 704 in this example). As the sixteen MSBs of the memory address of the target pointer "b" will record the type identification for class B also, the operation 744 may determine, from the class inheritance relationship, whether the class identified by "_B_id" and the class which is pointed to by the target pointer "b" have any inheritance or not.

In some embodiments, since the type identifications for the classes and the class inheritance relationship are not determined at the compiling stage, in generating the operations 742 and 744, the compiler 610 may represent, in the intermediate code section 612-2, the type identification for class B as an external relocation symbol and the class inheritance relationship as a further external relocation symbol. For example, a statement 730 is included in the intermediate code section 612-2 to define the type identification for class B as an external relocation symbol "_B_id". A further statement 750 is included to define the class inheritance relationship as an external relocation symbol "_relationship_table". The two external relocation symbols may be resolved at the linking stage by the linker 620 after the respective type identifications of the classes are assigned and the class inheritance relationship is determined.

Figure 8:
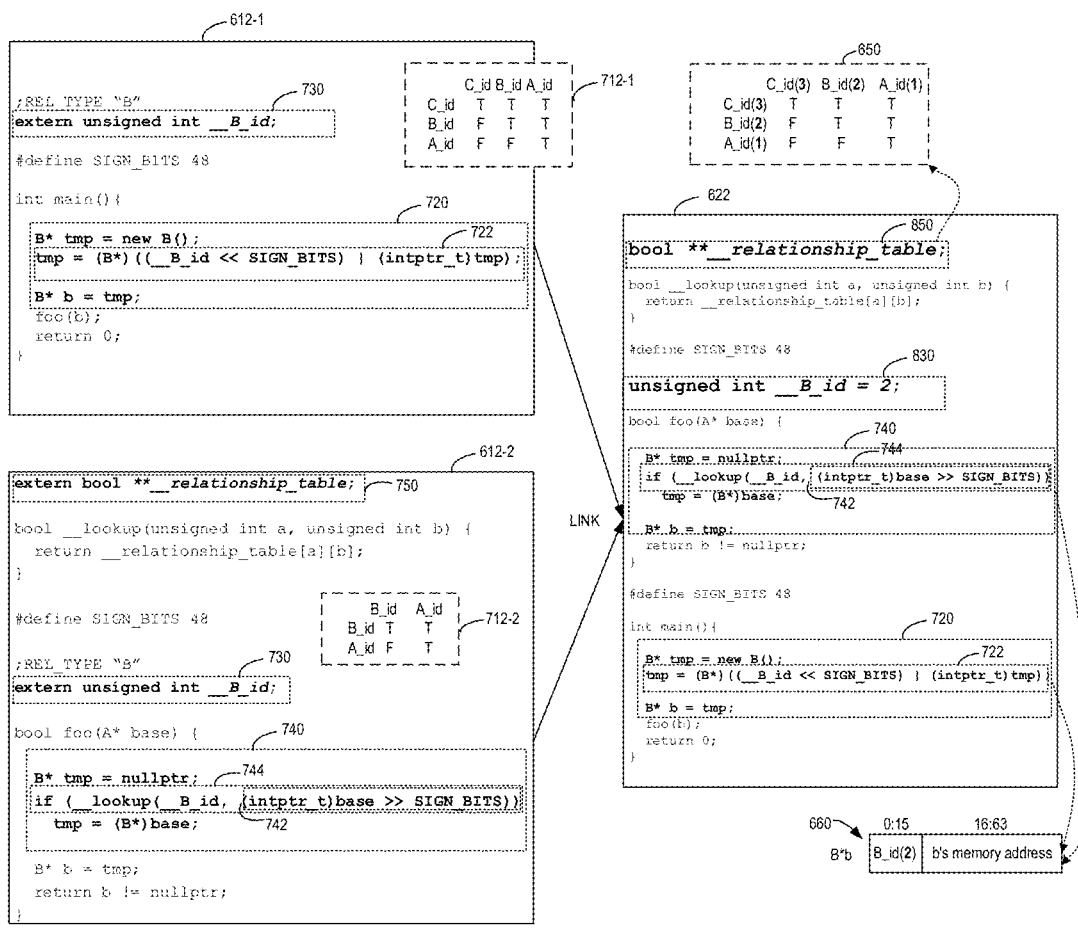
FIG. 8 depicts an example of a linking stage of source code sections according to some embodiments of the present invention.

The intermediate code sections 612-1, 612-2 as well as the partial class inheritance relationships 712-1, 712-2 derived from the source code sections 602-1, 602-2 may be provided the linker 620 for further processing. As specifically shown in FIG. 8, the partial class inheritance relationships 712-1, 712-2 are also combined by the linker 620 to generate the class inheritance relationship 650. The linker 620 may eliminate the duplicated inheritance presented in the partial class inheritance relationships 712-1, 712-2. By identifying all the classes and their inheritance relationship from the partial class inheritance relationships 712-1, 712-2, the linker 620 may assign unique type identifications to the classes, including class A, class B, and class C. As a simple example, class A, class B, and class C are identified with numerical symbols 1, 2, 3, respectively. The assigned type identifications may be used to localize the corresponding classes from the class inheritance relationship 650 so as to determine whether any two classes have an inheritance relationship, for example, one class inherits from another class.

The intermediate code sections 612-1, 612-2 are also linked by the linker 620 to generate the executable 622. The sets of operations 720, 740 transformed from the operations 702, 704 are also incorporated in the executable 622 after the linking. The operations in the sets 720, 740 can directly extract the type identification for the target class, e.g., class B, from the memory address of the target pointer "b" stored in the memory space 660.

At the linking stage, the linker 620 may resolve the external relocation symbols in the intermediate code sections 612-1, 612-2 to allow execution of the executable 622. In particular, the type identification for class B is resolved by a statement 830 in the executable 622, indicating that the type identification is set as "2." The class inheritance relationship is resolved by a statement 850 in the executable 622 which refers to the class inheritance relationship 650 stored in a specific memory area.

With the use of the class inheritance relationship 650 and the type identification stored with a bit(s) of the memory address of the target class, at runtime of the executable 622, RTTI can be performed efficiently. Specifically, by execution of the operation 742, it can be determined that the target pointer "b" points to an object of class B by extracting the type identification "2" from the sixteen MSBs of the memory address of the target pointer "b". The known type identification "_B_id" is set to the type identification "2." Thus, execution of the operation 744 may cause searching, from the class inheritance relationship 650, for an inheritance between class B and class B, which is indicated as "T," indicating that there is an inheritance between the two classes. As a result, the "dynamic_cast" operation for RTTI can be performed to convert a pointer of a base class to be a pointer to an object of class B.

It would be appreciated that although recording of a type identification for one target class and RTTI of an object of a class pointed to by a certain pointer is described in some embodiments above, for one or more other pointers to objects of other classes included in the source code section(s), the same process can be applied to implement the corresponding RTTI.

According to the example embodiments of the present disclosure, when there is one or more classes deleted from and/or added to the source code section(s), by compiling and linking the source code section(s) again, the new class inheritance relationship can be generated and the RTTI may also be performed at runtime according to the operations generated and incorporated in the resulting executable.

It should be noted that the processing of RTTI according to embodiments of this disclosure could be implemented by the computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   generating, by one or more processors, a class inheritance relationship between a plurality of classes in at least one source code section;
   assigning, by one or more processors, respective type identifications to identify the plurality of classes in the class inheritance relationship;
   in accordance with presence of a first operation related to accessing a target pointer to an object of a target class of the plurality of classes in the at least one source code section, causing, by one or more processors, a type identification for the target class to be recorded with at least one bit of a memory address of the target pointer, the at least one bit being omitted in addressing the target pointer; and
   performing, by one or more processors, runtime type identification of the object of the target class pointed to by the target pointer based on the class inheritance relationship and the at least one bit of the memory address of the target pointer, wherein performing the runtime type identification of the object includes linking a plurality of different intermediate source code sections compiled from a plurality of different source code sections to form an executable, and wherein the executable references the class inheritance relationship between the plurality of classes stored in a specific memory area.

2. The computer-implemented method of claim 1, wherein the at least one source code section comprises a plurality of source code sections, and wherein generating the class inheritance relationship comprises:
   determining, by one or more processors, a plurality of partial class inheritance relationships from the plurality of source code sections at a compiling stage of the plurality of source code sections, each of the plurality of partial class inheritance relationships indicating an inheritance between at least two of the plurality of classes; and
   combining, by one or more processors, the plurality of partial class inheritance relationships at a linking stage of the at least one source code section, to obtain the class inheritance relationship.

3. The computer-implemented method of claim 1, wherein causing the type identification for the target class to be recorded with the at least one bit of the memory address of the target pointer comprises:
   transforming, by one or more processors, the first operation to a second operation of recording the type identification for the target class with the at least one bit of the memory address of the target pointer; and
   incorporating, by one or more processors, the second operation into an executable corresponding to the at least one source code section.

4. The computer-implemented method of claim 3, wherein transforming the first operation to the second operation comprises:
   generating, by one or more processors, the second operation at a compiling stage of the at least one source code section by representing the type identification for the target class as an external relocation symbol in the second operation; and resolving, by one or more processors, the external relocation symbol at a linking stage of the at least one source code section.

5. The computer-implemented method of claim 3, wherein the first operation comprises one of an operation of creating the object of the target class, an operation of getting the memory address of the target pointer, and an operation of converting a memory address to the target pointer.

6. The computer-implemented method of claim 1, wherein causing the runtime type identification to be performed comprises:
in accordance with presence of a third operation for runtime type identification of the target pointer in the at least one source code section, transforming, by one or more processors, the third operation to:
a fourth operation of extracting the type identification for the target class from the at least one bit of the memory address of the target pointer, and
a fifth operation of searching, from the class inheritance relationship, for an inheritance between the target class and a further class of the plurality of classes based at least on the extracted type identification; and
incorporating the fourth and fifth operations into an executable corresponding to the at least one source code section.

7. The computer-implemented method of claim 6, wherein transforming the third operation to the fourth and fifth operations comprises:
generating, by one or more processors, the fourth and fifth operations at a compiling stage of the at least one source code section by representing the type identification for the target class as an external relocation symbol and representing the class inheritance relationship as a further external relocation symbol in the fifth operation; and
resolving, by one or more processors, the external relocation symbol and the further external relocation symbol at a linking stage of the at least one source code section.

8. The computer-implemented method of claim 1, wherein assigning the respective type identifications to the plurality of classes comprises:
assigning, by one or more processors, the respective type identifications to identify the plurality of classes at a linking stage of the at least one source code section.

9. The computer-implemented method of claim 1, wherein the class inheritance relationship comprises a plurality of elements, each of the plurality of elements indicating whether a class of the plurality of classes inherits from another class of the plurality of classes or not.

10. The computer-implemented method of claim 1, wherein the at least one bit of the memory address comprises at least one most significant bit or at least one lowest significant bit of the memory address.

11. A system comprising:
a processing unit; and
a memory coupled to the processing unit and storing instructions thereon, the instructions, when executed by the processing unit, performing acts comprising:
generating a class inheritance relationship between a plurality of classes in at least one source code section;
assigning respective type identifications to identify the plurality of classes in the class inheritance relationship;
in accordance with presence of a first operation related to accessing a target pointer to an object of a target class of the plurality of classes in the at least one source code section, causing a type identification for the target class to be recorded with at least one bit of a memory address of the target pointer, the at least one bit being omitted in addressing the target pointer; and
causing runtime type identification of the object of the target class pointed to by the target pointer to be performed based on the class inheritance relationship and the at least one bit of the memory address of the target pointer, wherein performing the runtime type identification of the object includes linking a plurality of different intermediate source code sections compiled from a plurality of different source code sections to form an executable, and wherein the executable references the class inheritance relationship between the plurality of classes stored in a specific memory area.

12. The system of claim 11, wherein the at least one source code section comprises a plurality of source code sections, and wherein generating the class inheritance relationship comprises:
determining a plurality of partial class inheritance relationships from the plurality of source code sections at a compiling stage of the plurality of source code sections, each of the plurality of partial class inheritance relationships indicating an inheritance between at least two of the plurality of classes; and
combining the plurality of partial class inheritance relationships at a linking stage of the at least one source code section, to obtain the class inheritance relationship.

13. The system of claim 11, wherein causing the type identification for the target class to be recorded with the at least one bit of the memory address of the target pointer comprises:
transforming the first operation to a second operation of recording the type identification for the target class with the at least one bit of the memory address of the target pointer; and
incorporating the second operation into an executable corresponding to the at least one source code section.

14. The system of claim 13, wherein transforming the first operation to the second operation comprises:
generating the second operation at a compiling stage of the at least one source code section by representing the type identification for the target class as an external relocation symbol in the second operation; and
resolving the external relocation symbol at a linking stage of the at least one source code section.

15. The system of claim 13, wherein the first operation comprises one of an operation of creating the object of the target class, an operation of getting the memory address of the target pointer, and an operation of converting a memory address to the target pointer.

16. The system of claim 11, wherein causing the runtime type identification to be performed comprises:
in accordance with presence of a third operation for runtime type identification of the target pointer in the at least one source code section, transforming the third operation to:
a fourth operation of extracting the type identification for the target class from the at least one bit of the memory address of the target pointer, and
a fifth operation of searching, from the class inheritance relationship, for an inheritance between the target class and a further class of the plurality of classes based at least on the extracted type identification; and incorporating the fourth and fifth operations into an executable corresponding to the at least one source code section.

17. The system of claim 16, wherein transforming the third operation to the fourth and fifth operations comprises:

generating the fourth and fifth operations at a compiling stage of the at least one source code section by representing the type identification for the target class as an external relocation symbol and representing the class inheritance relationship as a further external relocation symbol in the fifth operation; and resolving the external relocation symbol and the further external relocation symbol at a linking stage of the at least one source code section.

18. The system of claim 11, wherein assigning the respective type identifications to the plurality of classes comprises:

assigning the respective type identifications to identify the plurality of classes at a linking stage of the at least one source code section.

19. A computer program product, the computer program product comprising a computer readable storage medium having program instructions embodied therewith, the program instructions executable by an electronic device to cause the electronic device to perform acts comprising:

generating a class inheritance relationship between a plurality of classes in at least one source code section;

assigning respective type identifications to identify the plurality of classes in the class inheritance relationship;

in accordance with presence of a first operation related to accessing a target pointer to an object of a target class of the plurality of classes in the at least one source code section, causing a type identification for the target class to be recorded with at least one bit of a memory address of the target pointer, the at least one bit being omitted in addressing the target pointer; and causing runtime type identification of the object of the target class pointed to by the target pointer to be performed based on the class inheritance relationship and the at least one bit of the memory address of the target pointer, wherein performing the runtime type identification of the object includes linking a plurality of different intermediate source code sections compiled from a plurality of different source code to form an executable, and wherein the executable references the class inheritance relationship between the plurality of classes stored in a specific memory area.

20. The computer program product of claim 19, wherein the at least one source code section comprises a plurality of source code sections, and wherein generating the class inheritance relationship comprises:

determining a plurality of partial class inheritance relationships from the plurality of source code sections at a compiling stage of the plurality of source code sections, each of the plurality of partial class inheritance relationships indicating an inheritance between at least two of the plurality of classes; and combining the plurality of partial class inheritance relationships at a linking stage of the at least one source code section, to obtain the class inheritance relationship.

* * * * *